US011858271B2

(12) United States Patent
Yamashita

(10) Patent No.: US 11,858,271 B2
(45) Date of Patent: Jan. 2, 2024

(54) LIQUID DISCHARGE DEVICE AND IMAGE FORMING APPARATUS

(71) Applicant: Hiroyuki Yamashita, Kanagawa (JP)

(72) Inventor: Hiroyuki Yamashita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 15 days.

(21) Appl. No.: 17/669,396

(22) Filed: Feb. 11, 2022

(65) Prior Publication Data

US 2022/0258476 A1 Aug. 18, 2022

(30) Foreign Application Priority Data

Feb. 16, 2021 (JP) ................................ 2021-022529
Sep. 28, 2021 (JP) ................................ 2021-158094

(51) Int. Cl.
*B41J 2/165* (2006.01)

(52) U.S. Cl.
CPC ....... *B41J 2/16547* (2013.01); *B41J 2/16538* (2013.01); *B41J 2/16544* (2013.01); *B41J 2/16552* (2013.01); *B41J 2002/16558* (2013.01)

(58) Field of Classification Search
CPC . B41J 2/16547; B41J 2/16538; B41J 2/16544
See application file for complete search history.

(56) References Cited

U.S. PATENT DOCUMENTS

2006/0098040 A1 5/2006 Kang
2009/0046122 A1 2/2009 Inoue
2012/0127231 A1 5/2012 Nukui
2018/0126737 A1 5/2018 Asano
2018/0207936 A1 7/2018 Satake et al.
2018/0264824 A1 9/2018 Araki et al.
2020/0282727 A1 9/2020 Hanano

FOREIGN PATENT DOCUMENTS

| | | | | | |
|---|---|---|---|---|---|
| CN | 108340674 | A | | 7/2018 | |
| EP | 1 016 529 | A1 | | 5/2000 | |
| JP | 2003341078 | A | * | 12/2003 | .......... B41J 2/16538 |
| JP | 2010-105341 | | | 5/2010 | |
| JP | 2010-173282 | | | 8/2010 | |
| JP | 2012-035440 | | | 2/2012 | |
| JP | 2019-014155 | | | 1/2019 | |
| KR | 20070021427 | A | * | 2/2007 | |

OTHER PUBLICATIONS

Extended European Search Report dated Jun. 29, 2022 in European Patent Application No. 22155408.2, 8 pages.
Chinese Office Action dated Apr. 22, 2023, in corresponding Chinese Patent Application 202210136574.6, 6pp.

* cited by examiner

*Primary Examiner* — Sharon Polk
(74) *Attorney, Agent, or Firm* — XSENSUS LLP

(57) ABSTRACT

A liquid discharge device includes a liquid discharge unit that discharges a liquid and a cleaner. The liquid discharge unit has a first end, a second end, and a third end extending in a direction intersecting the first end and the second end. The cleaner moves relative to the liquid discharge unit in a movement direction from the first end toward the second end while contacting the liquid discharge unit with a contact force and a contact pressure. The contact force of the cleaner contacting one of the first end and the second end is smaller than the contact force of the cleaner contacting a portion of the liquid discharge unit other than the first end and the second end.

20 Claims, 11 Drawing Sheets

LIQUID DISCHARGE DEVICE AND IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2021-022529, filed on Feb. 16, 2021 and 2021-158094, filed on Sep. 28, 2021, in the Japan Patent Office, the entire disclosure of each of which is hereby incorporated by reference herein.

BACKGROUND

Technical Field

Aspects of the present disclosure relate to a liquid discharge device and an image forming apparatus.

Description of the Related Art

There is known an inkjet image forming apparatus that serves as a copier or a printer. The inkjet image forming apparatus discharges ink from a liquid discharge unit to form an image on a sheet. Such an inkjet image forming apparatus includes a cleaner that cleans the liquid discharge unit to satisfactorily maintain the function of the liquid discharge unit.

SUMMARY

Embodiments of the present disclosure describe an improved liquid discharge device that includes a liquid discharge unit to discharge a liquid and a cleaner. The liquid discharge unit has a first end, a second end, and a third end extending in a direction intersecting the first end and the second end. The cleaner moves relative to the liquid discharge unit in a movement direction from the first end toward the second end while contacting the liquid discharge unit with a contact force and a contact pressure. The contact force of the cleaner contacting one of the first end and the second end is smaller than the contact force of the cleaner contacting a portion of the liquid discharge unit other than the first end and the second end.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
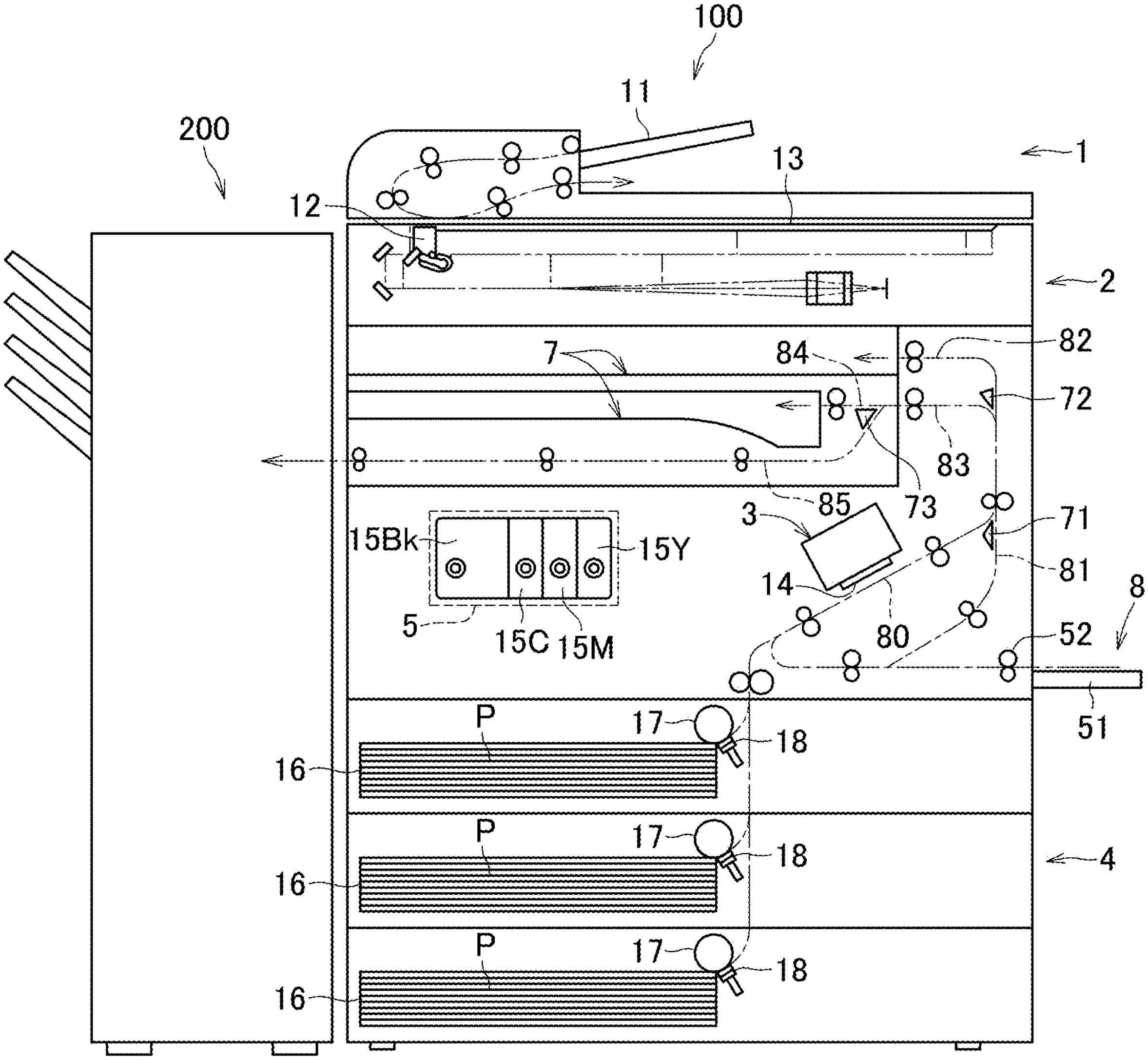
FIG. 1 is a schematic view of an image forming apparatus according to embodiments of the present disclosure.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology is employed for the sake of clarity.

However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a," "an," and "the" are intended to include the plural forms as well, unless the context clearly indicates otherwise.

It is to be noted that the suffixes Y, M, C, and Bk attached to each reference numeral indicate only that components indicated thereby are used for forming yellow, magenta, cyan, and black images, respectively, and hereinafter may be omitted when color discrimination is not necessary.

With reference to drawings, descriptions are given below of embodiments of the present disclosure. In the drawings for illustrating embodiments of the present disclosure elements or components identical or similar in function or shape are given identical reference numerals as far as distinguishable, and redundant descriptions are omitted.

FIG. 1 is a schematic view of an image forming apparatus 100 according to an embodiment of the present disclosure. As illustrated in FIG. 1, the image forming apparatus 100 according to the present embodiment includes a document conveyance device 1, an image reading device 2, an image thrilling device 3, a sheet feeding device 4, a cartridge mount 5, a sheet ejection portion 7, and a bypass sheet feeding device 8. Further, a sheet alignment apparatus (sheet jogger) 200 is disposed adjacent to the image forming apparatus 100.

The document conveyance device 1 separates a document one by one from multiple documents on a document tray 11 and conveys the separated document toward an exposure glass 13 of the image reading device 2. The document conveyance device 1 includes a plurality of conveyance rollers each functioning as a document conveyor to convey the document.

The image reading device 2 is an image scanner, in other words, a device to scan an image on a document placed on the exposure glass 13 or an image an a document as the document passes over the exposure glass 13. The image reading device 2 includes an optical scanning, unit 12 as an image reading unit. The optical scanning unit 12 includes a light source that irradiates a document placed on the exposure glass 13 with light, and a charge-coupled device (CCD) as an image reader that reads an image from the reflected light of the document. Alternatively, a close contact-type image sensor (CIS) may be employed as an image reader.

The image forming device 3 includes a liquid discharge device that discharges liquid ink onto a sheet to form an image. The liquid discharge device includes a liquid discharge head 14 as a liquid discharge unit.

Ink cartridges 15Y, 15M, 15C, and 15Bk, are removably mounted in the cartridge mount 5. The ink cartridges 15Y, 15M, 15C, and 15Bk are filled with inks of different colors such as yellow, magenta, cyan, and black, respectively. The ink in each ink cartridge the ink cartridges 15Y, 15M, 15C, and 15Bk) is supplied to the liquid discharge head 14 by a supply pump.

The sheet feeding device 4 includes a plurality of sheet feed trays 16 each functioning as a sheet container. Each sheet feed tray 16 loads a bundle of sheets P. Each sheet P on which an image is to be formed is a cut sheet which is previously cut in a predetermined size, e.g., A4 size and B4 size, and is contained in the sheet feed tray 16 in a corresponding sheet conveyance direction. Further, each sheet feed tray 16 includes a sheet feed roller 17 that functions as a sheet feeder and a sheet separation pad 18 that functions as a sheet separator. As the sheet feed roller 17 rotates, an uppermost sheet P placed on top of the bundle of sheets P contained in the sheet feed tray 16 is fed by the sheet feed roller 17 and the sheet separation pad 18 while the uppermost sheet P is separated from the other sheets of the bundle of sheets.

The bypass sheet feeding device 8 includes a bypass tray 51 and a bypass sheet feed roller 52. The bypass tray 51 functions as a sheet loader to load a sheet(s) P. The bypass sheet feed roller 52 serves as a sheet feeder to feed the sheet P from the bypass tray 51. The bypass tray 51 is attached to the body of the image thrilling apparatus 100 and is openable and closable with respect to the body of the image forming apparatus 100. In other words, the bypass tray 51 is swingably attached to the body of the image forming apparatus 100. When the bypass tray 51 is open (in the state illustrated in FIG. 1), a sheet P or a bundle of sheets P can be loaded on the bypass tray 51 to feed the sheet P.

The sheet alignment apparatus 200 functions as a post-processing apparatus to align and jog, the sheets P conveyed from the image forming apparatus 100. In addition to the sheet alignment apparatus 200, another post-processing apparatus such as a stapling apparatus that staples (binds) the sheets P and a punching apparatus that punches holes in the sheet P may be installed.

With continued reference to FIG. 1, a description is given of an operation of the image forming apparatus 100 according, to the present embodiment. As the image forming apparatus 100 receives an instruction to start a printing operation, the sheet P is fed from the sheet feeding device 4 or the bypass sheet feeding device 8. As the sheet P is conveyed to a sheet conveyance passage 80 facing the image forming device 3, the image forming device 3 forms an image on the sheet P. Specifically, the liquid discharge head 14 discharges ink to the sheet P based on image data of the document read by the image reading device 2 or print data transmitted by a terminal device, thereby forming an image on an image formation surface (front face) of the sheet P. Note that the image to be formed on the sheet P may be a meaningful image such as text or a figure, or a pattern that is meaningless.

In the duplex printing, the sheet P is conveyed in the opposite direction opposite to the sheet conveyance direction at a position downstream from the image forming device 3 in the sheet conveyance direction and guided to a sheet reverse passage 81. Specifically, after the trailing end of the sheet P has passed a first passage changer 71 that is disposed downstream from the image forming device 3 in the sheet conveyance direction, the first passage changer 71 changes the route to the sheet reverse passage 81, and the sheet P is conveyed in the opposite direction. Accordingly, the sheet P is guided to the sheet reverse passage 81. As the sheet P passes through the sheet reverse passage 81, the sheet P is reversed from the front face to the back face and conveyed to the image forming device 3 again. Then, the image forming device 3 repeats the same operation performed to the front face of the sheet P, thereby forming an image on the back face of the sheet P.

A second passage changer 72 is disposed downstream from the first passage changer 71. The second passage changer 72 guides the sheet P, on which the image has been formed, selectively to a sheet conveyance passage 82 toward the upper sheet ejection portion 7 or to a sheet conveyance passage 83 toward the lower sheet ejection portion 7. When the sheet P is guided to the sheet conveyance passage 82 toward the upper sheet ejection portion 7, the sheet P is ejected onto the upper sheet ejection portion 7. On the other hand, when the sheet P is guided to the sheet conveyance passage 83 toward the lower sheet ejection portion 7, a third passage changer 73 guides the sheet P selectively to a sheet, conveyance passage 84 toward the lower sheet ejection portion 7 or to a sheet conveyance passage 85 toward the sheet alignment apparatus 200.

When the sheet P is guided to the sheet conveyance passage 84 toward the lower sheet ejection portion 7, the sheet P is ejected onto the lower sheet ejection portion 7. On the other hand, when the sheet P is guided to the sheet conveyance passage 85 toward the sheet alignment apparatus 200, the sheet is conveyed to the sheet alignment apparatus 200, and the bundle of sheets P is aligned and stacked. Thus, a series of printing operations is completed.

Figure 2:
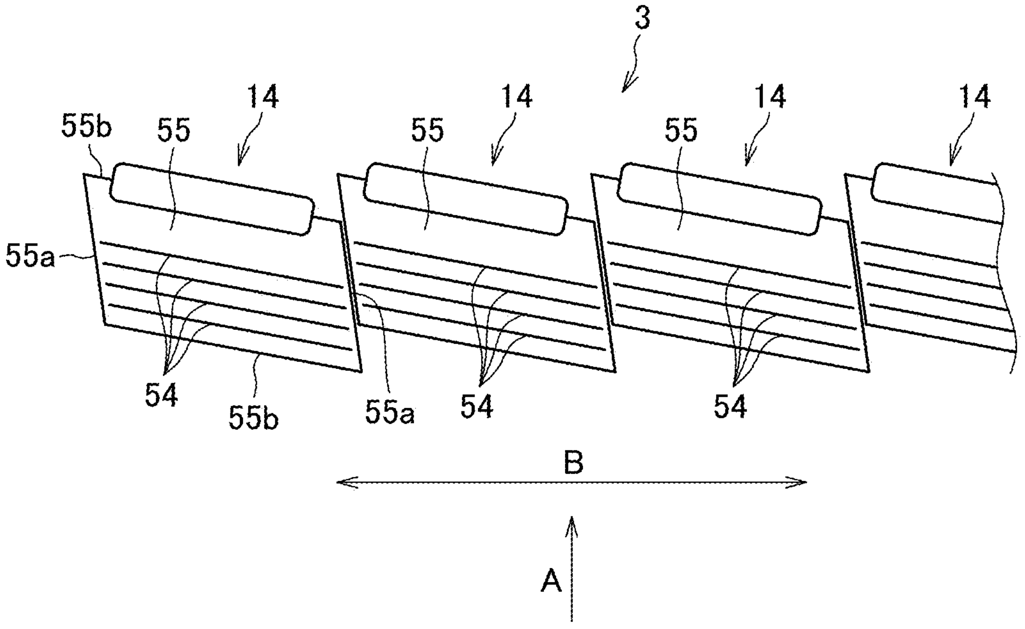
FIG. 2 is a schematic view of a liquid discharge device according to embodiments of the present disclosure.

Next, the configuration of the liquid discharge device according to the present embodiment is described with reference to FIG. 2. As illustrated in FIG. 2, the liquid discharge device (image forming device 3) according to the present embodiment includes multiple liquid discharge heads 14 arranged side by side in sheet width directions B. The sheet width directions B are directions intersecting or perpendicular to a sheet conveyance direction A in which the sheet P is conveyed. Note that the liquid discharge device according to the present embodiment is not limited to a configuration having the multiple liquid discharge heads 14 as illustrated in FIG. 2, and may have a configuration having one liquid discharge head disposed over the entire sheet width directions B.

Each liquid discharge head 14 includes a nozzle row 54 (four nozzle rows in FIG. 2) in which a plurality of nozzles is arranged. In the present embodiment, when the sheet P conveyed to the image forming device 3 and passes through a region facing the image forming device 3, each liquid discharge head 14 is controlled in response to a drive signal based on image data to discharge ink. Thus, ink of each color is discharged from each liquid discharge head 14 onto the sheet P, thereby forming an image corresponding to the image data on the sheet P. As described above, the liquid discharge device according to the present embodiment is a so-called line-type liquid discharge device in which each liquid discharge head 14 discharges ink without moving relative to the sheet P being conveyed. Note that the liquid discharge device according to the present disclosure is not limited to the line-type liquid discharge device and may be a serial-type liquid discharge device described later in which the liquid discharge head discharges ink while moving in a maw scanning direction (sheet width direction).

As illustrated in FIG. 2, in the present embodiment, a nozzle surface 55 of each liquid discharge head 14 has a parallelogram shape. Specifically, each liquid discharge head 14 has the nozzle surface 55 having the parallelogram shape including a pair of short sides 55*a* extending transversely to the sheet width directions B and a pair of long sides 55*b* extending in the sheet width directions B. The nozzle rows 54 on the nozzle surface 55 are arranged parallel to the long sides 55*b* of the nozzle surface 55. Further, end portions of the nozzle rows 54 of the adjacent liquid discharge heads 14 are disposed so as to overlap each other as viewed in the sheet conveyance direction A. Thus, ink can be discharged without interrupting an image between the liquid discharge heads 14 adjacent to each other in the sheet width directions B.

In the inkjet image forming device that discharges ink from the liquid discharge head to form an image on a sheet, a maintenance device is generally provided to maintain and recover the function of the liquid discharge head. The maintenance device includes, for example, a cap that covers the nozzle surface of the liquid discharge head and a cleaner that cleans the nozzle surface.

Figure 3:
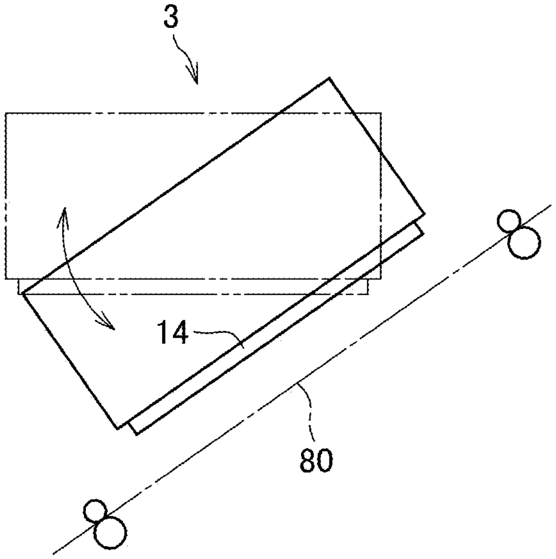
FIG. 3 is a schematic view illustrating a maintenance operation of the liquid discharge device according to embodiments of the present disclosure.

Hereinafter, a maintenance operation according to the present embodiment is described with reference to FIGS. 3 to 6. As illustrated in FIG. 3, in the image forming device 3, the posture of the liquid discharge head 14 is switchable between a state of being disposed obliquely with respect to the horizontal direction as illustrated by the solid line in FIG. 3 and a state of being disposed in the horizontal direction (also referred to as a position retracted from the sheet conveyance passage 80) as illustrated by the long dashed double-short dashed line in FIG. 3. When an image is formed on the sheet P, the liquid discharge head 14 is obliquely disposed and faces the sheet conveyance passage 80. On the other hand, when the image forming operation is finished and the maintenance operation of the liquid discharge head 14 is performed, the liquid discharge head 14 is disposed in the horizontal direction.

Figure 4:
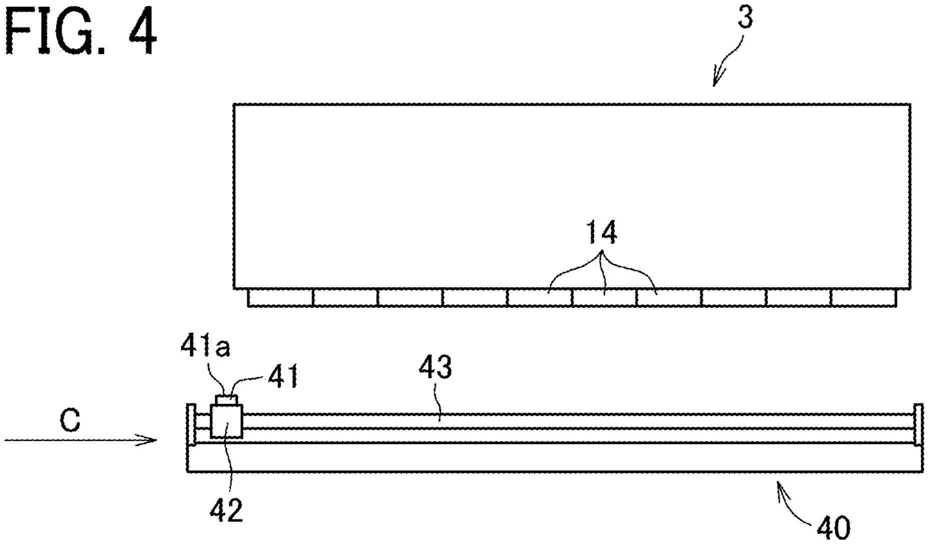
FIG. 4 is a schematic view illustrating the maintenance operation of the liquid discharge device according to embodiments of the present disclosure.

When the maintenance operation is performed, as illustrated in FIG. 4, a maintenance device 40 approaches the liquid discharge head 14 switched to the horizontal posture. The maintenance device 40 is included in the liquid discharge device serving as the image forming device 3. The maintenance device 40 moves in the horizontal direction (i.e., a movement direction C which is one of the sheet width directions B) to be arranged below the liquid discharge heads 14. The maintenance device 40 includes a suction wiper 41 as a cleaner that cleans the nozzle surface 55 of the liquid discharge head 14. The suction wiper 41 is a tubular member made of an elastic body such as rubber and has a suction port 41*a* at the tip thereof. The suction wiper 41 is mounted on a carriage 42 that reciprocates in the sheet width directions B. When the carriage 42 moves along a guide rail 43, the suction wiper 41 moves together with the carriage 42 in the movement direction C which is one of the sheet width directions 13.

Figure 5:
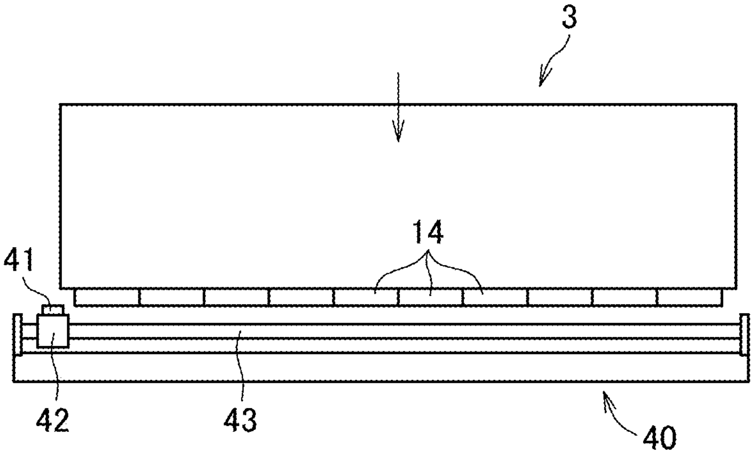
FIG. 5 is a schematic view illustrating the maintenance operation of the liquid discharge device according to embodiments of the present disclosure.
Figure 6:
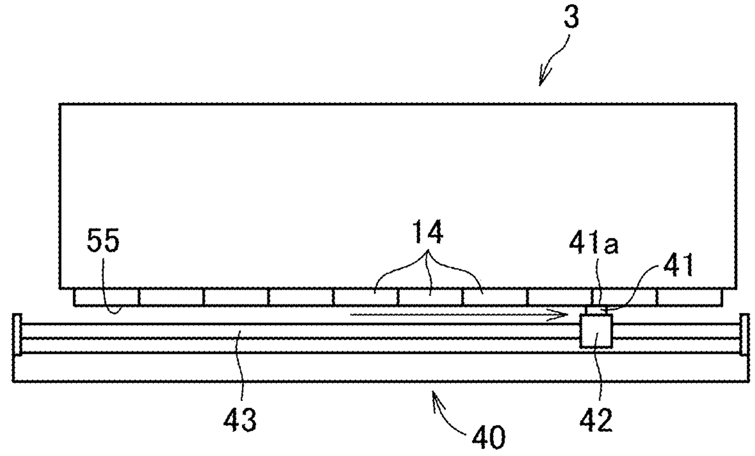
FIG. 6 is a schematic view illustrating the maintenance operation of the liquid discharge device according to embodiments of the present disclosure.

Subsequently, as illustrated in FIG. 5, the liquid discharge head 14 is lowered and arranged at a position where the liquid discharge head 14 can be cleaned. Alternatively, the maintenance device 40 may be lifted and arranged at a position where the liquid discharge head 14 can be cleaned without lowering the liquid discharge head 14. In this state, as illustrated in FIG. 6, the suction wiper 41 moves along the guide rail 43, so that the suction wiper 41 cleans the nozzle surface 55 of the liquid discharge head 14 while contacting the nozzle surface 55. Specifically, as the suction wiper 41 moves while contacting the nozzle surface 55, ink remaining in the nozzle (discharge port) is wiped and removed, and the removed ink is sucked and collected from the suction port 41*a* of the suction wiper 41. As a result, a cleaning operation by the suction wiper 41 is finished.

After the cleaning operation is finished, the liquid discharge head 14 is covered with the cap to prevent ink discharge failure due to drying. Thereafter, when the image forming operation is performed again, the cap is separated from the liquid discharge head 14, and the maintenance device 40 is moved and retracted from the position facing the liquid discharge head 14 in the horizontal direction. Then, the liquid discharge head 14 is switched to the oblique posture and is ready to form an image.

Here, the suction wiper 41 is formed of an elastic material such as rubber so that the nozzle surface 55 of the liquid discharge head 14 is not damaged. However, when the suction wiper 41 performs the cleaning operation, if the suction wiper 41 contacts an end or a corner of the liquid discharge head 14, the suction wiper 41 may be damaged or deteriorated due to the contact. Therefore, in the present embodiment, the following measures are taken to suppress damage and deterioration of the suction wiper 41.

Figure 7:
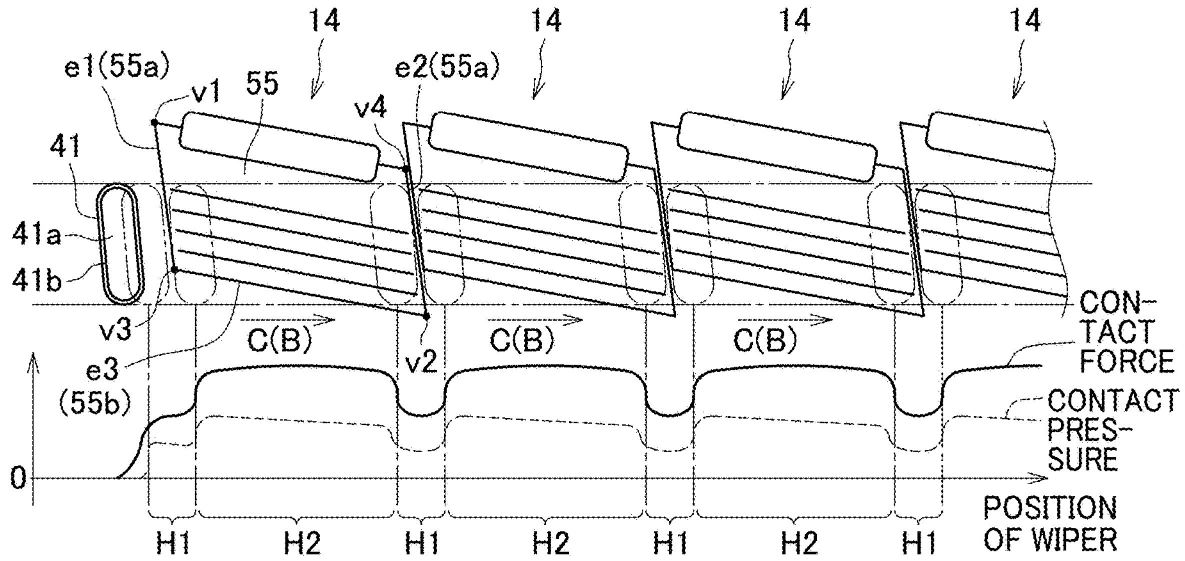
FIG. 7 is a schematic view of liquid discharge heads of the liquid discharge device and a suction wiper, and a graph illustrating a contact force and a contact pressure of the suction wiper according to a first embodiment of the present disclosure.

FIG. 7 is a schematic view of the liquid discharge heads 14 and the suction wiper 41, and a graph illustrating a contact force and a contact pressure of the suction wiper 41 according to a first embodiment of the present disclosure.

As illustrated in FIG. 7, the suction wiper 41 according to the present embodiment moves in the movement direction C (one of the sheet width directions B), thereby performing the cleaning operation while a contact portion 41*b* of the suction wiper 41 contacts the nozzle surface 55 from a first end e1 toward a second end e2 of each liquid discharge head 14. At that time, as the contact portion 41*b* of the suction wiper 41 contacts the first end e1 and the second end e2 (short sides 55*a*) of each liquid discharge head 14 intersecting the movement direction C, the contact portion 41*b* of the suction wiper 41 may be damaged and deteriorated. In the present specification, the "first end of the liquid discharge head" (also referred to as an "intersecting end") means an end of the liquid discharge head that the cleaner (e.g., the suction wiper 41) starts contacting when the cleaner moves relative to the liquid discharge head while contacting, the liquid discharge head, and the "second end of the liquid discharge head" (also referred to as an "intersecting end") means an end of the liquid discharge head that the cleaner finishes contacting when the cleaner moves relative to the liquid discharge head while contacting the liquid discharge head.

In the present embodiment, to suppress such damage and deterioration of the suction wiper 41, the contact force (pressing force) of the suction wiper 41 with each liquid discharge head 14 is relatively small when the contact portion 41*b* of the suction wiper 41 passes through one of the first end e1 and the second end e2 intersecting the movement direction C (i.e., the intersecting ends). That is, as illustrated, in FIG. 7, the contact force of the contact portion 41*b* of the suction wiper 41 contacting one of the first end e1 and the second end e2 (intersecting ends) of the liquid discharge head 14 in movement ranges H1 is smaller than the contact force of the contact portion 41*b* of the suction wiper 41 contacting a portion of the liquid discharge head 14 other than the first end e1 and the second end e2 in movement ranges H2.

As described above, in the present embodiment, when the contact portion 41*b* of the suction wiper 41 is contacting one of the first end e1 and the second end e2 (the intersecting ends), the contact force of the suction wiper 41 is relatively small, so that the contact pressure of the suction wiper 41 with the liquid discharge head 14 can be relatively small. In other words, the contact pressure of the contact portion 41*b* of the suction wiper 41 contacting one of the first end e1 and the second end e2 (intersecting ends) of the liquid discharge head 14 in movement ranges H1 is smaller than the contact pressure of the contact portion 41*b* of the suction wiper 41 contacting a portion of the liquid discharge head 14 other than the first end e1 and the second end e2 in movement ranges F12. Accordingly, the contact portion 41*b* of the suction wiper 41 can be prevented from being damaged and deteriorated when the contact portion 41*b* of the suction wiper 41 passes through one of the first end of e1 and the second end e2, thereby maintaining the cleaning function of the suction wiper 41 for a long time.

Further, as illustrated in FIG. 7, in the present embodiment, the suction wiper 41 moves in a movement path avoiding corners v1 and v2 having an acute angle among four corners (vertices) v1 to v4 of the nozzle surface 55. If the suction wiper 41 contacts the corners v1 and v2 having the acute angle, the contact with the corners v1 and v2 may cause to accelerate damage and deterioration of the suction wiper 41. Therefore, in the present embodiment, the movement path of the suction wiper 41 is set so as to avoid the corners v1 and v2 having the acute angle, thereby preventing damage and deterioration of the contact portion 41*b* of the suction wiper 41 due to contact with the corners v1 and v2 having the acute angle. Thus, damage and deterioration of the suction wiper 41 can be more electively suppressed.

Figure 8:
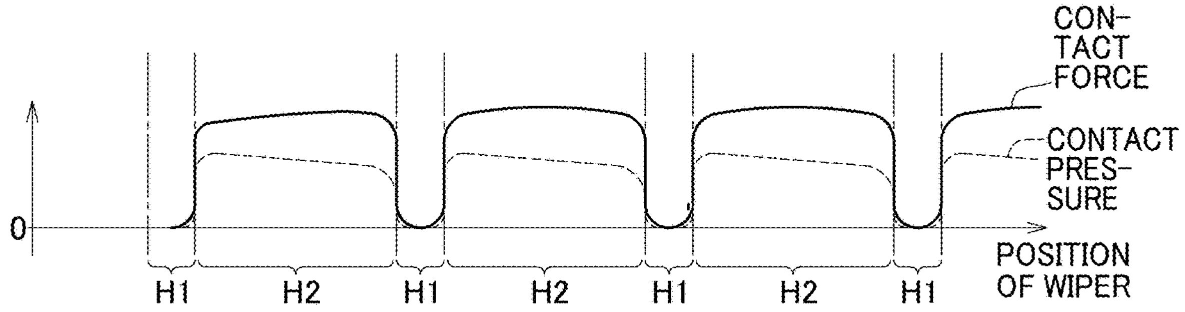
FIG. 8 is a graph illustrating the contact force and the contact pressure of the suction wiper according to a second embodiment of the present disclosure.

FIG. 8 is a graph illustrating the contact force and the contact pressure of the suction wiper 41 according to a second embodiment of the present disclosure. As illustrated in FIG. 8, in the present embodiment, when the contact portion 41*b* of the suction wiper 41 contacts the first end e1 and the second end e2 of the liquid discharge heads 14 in the movement ranges H1, the contact force and the contact pressure of the suction wiper 41 are 0 or substantially 0.

As described above, the contact force and the contact pressure when the contact portion 41*b* of the suction wiper 41 contacts the first end e1 and the second end e2 are set to 0 or substantially 0, so that damage and deterioration of the contact portion 41*b* of the suction wiper 41 can be more effectively suppressed. When the contact force and the contact pressure of the suction wiper 41 are 0 or substantially 0, the suction wiper 41 may contact the liquid discharge head 14 without the pressing force or may be separated from the liquid discharge head 14 in a non-contact state as long as there is no influence on the cleaning operation.

Figure 9:
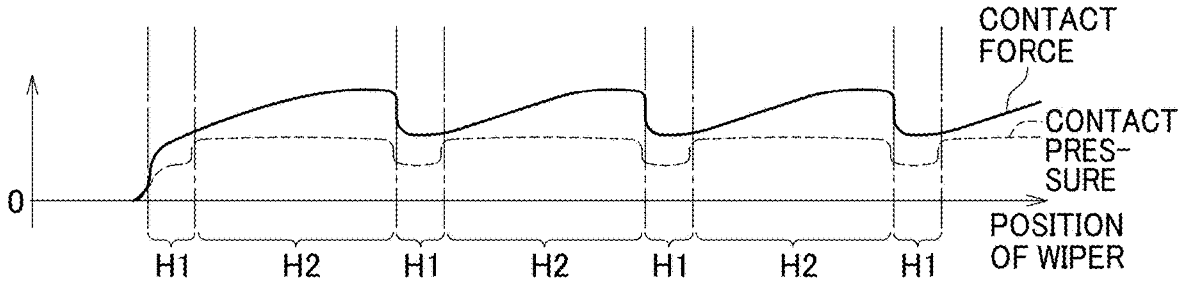
FIG. 9 is a graph illustrating the contact force and the contact pressure of the suction wiper according to a third embodiment of the present disclosure.

FIG. 9 is a graph illustrating the contact force and the contact pressure of the suction wiper 41 according to a third embodiment of the present disclosure. As illustrated in FIG. 9, in the present embodiment, when the contact portion 41*b* of the suction wiper 41 contacts the portion of the liquid discharge head 14 other than the first end e1 and the second end e2 of the liquid discharge heads 14 in the movement ranges H2, the contact force of the suction wiper 41 progressively increases to keep the contact pressure of the suction wiper 41 constant.

In the present embodiment, the basic configuration of the suction wiper 41 and the liquid discharge head 14 is the same as that of the above-described embodiment illustrated in FIG. 7, and a third end e3 (the long side 55*b*) of each liquid discharge head 14 is oblique with respect to the movement direction C. Accordingly, when the suction wiper 41 moves from the first end e1 to the second end e2 of the liquid discharge head 14, the contact area of the suction wiper 41 with the liquid discharge head 14 progressively increases. For this reason, similarly to the above-described embodiment illustrated in FIG. 7, when the contact three in the movement ranges H2 does not largely change after the contact portion 41*b* of the suction wiper 41 passes through the first end e1 and the second end e2, the contact area of the suction wiper 41 increases with the movement of the suction wiper 41, and the contact pressure of the suction wiper 41 progressively decreases.

On the other hand, in the present embodiment illustrated in FIG. 9, while the contact portion 41*b* of the suction wiper 41 contacts the portion of the liquid discharge head 14 other than the first end e1 and the second end e2 of the liquid discharge heads 14 in the movement ranges H2, the contact force of the suction wiper 41 increases with the movement of the suction wiper 41. Therefore, in the present embodiment, even if the contact area of the suction wiper 41 progressively increases, the contact pressure of the suction wiper 41 can be kept constant. As a result, the change of the suction force of the suction wiper 41 or the wiping action due to the change of the contact pressure can be prevented, thereby stabilizing the cleaning function.

Further, in the above-described embodiment illustrated to FIG. 7, the contact pressure of the suction wiper 41 decreases with the movement of the suction wiper 41. Therefore, the contact pressure is set larger than a predetermined reference value in advance to maintain the contact pressure equal to or larger than the reference value. On the other hand, in the present embodiment illustrated in FIG. 9, the contact pressure can be kept constant, so that the contact pressure of the suction wiper 41 can be set low overall as compared with the above-described embodiment illustrated in FIG. 7. Therefore, in the present embodiment, after the contact portion 41*b* of the suction wiper 41 passes through the first end e1 and the second end e2 of the liquid discharge heads 14, the contact pressure of the suction wiper 41 can be reduced when the contact portion 41*b* of the suction wiper 41 contacts the third end e3 (long side 55*b*) of each liquid discharge head 14 extending in the movement direction C.

As described above, in the present embodiment, the contact pressure can be further reduced and kept constant when the contact portion 31*b* of the suction wiper 41 contacts the long side 55*b* (third end e3 extending in the movement direction C) of the liquid discharge head 14. Therefore, damage and deterioration of the suction wiper 41 due to contact with the long side 55*b* can be suppressed, and the cleaning function of the suction wiper 41 can be stabilized.

Figure 10:
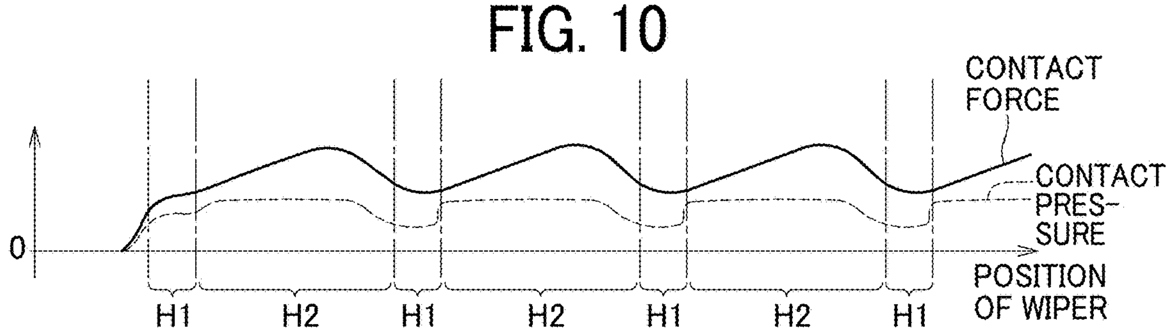
FIG. 10 is a graph illustrating the contact force and the contact pressure of the suction wiper according to a fourth embodiment of the present disclosure.

FIG. 10 is a graph illustrating the contact force and the contact pressure of the suction wiper 41 according to a fourth embodiment of the present disclosure. As illustrated in FIG. 10, in the present embodiment, the contact force and the contact pressure of the suction wiper 41 with the liquid discharge head 14 in the movement range H2 progressively decrease before the contact portion 41*b* of the suction wiper 41 contacts the second end e2 of the liquid discharge head 14. As described above, in the present embodiment, the contact force and the contact pressure of the suction wiper 41 progressively decrease to prevent the contact force and the contact pressure from sharply decreasing. As a result, variations in the cleaning function of the suction wiper 41 due to sharp changes in the contact force and the contact pressure can be suppressed, and the cleaning function can be stabilized.

Figure 11:
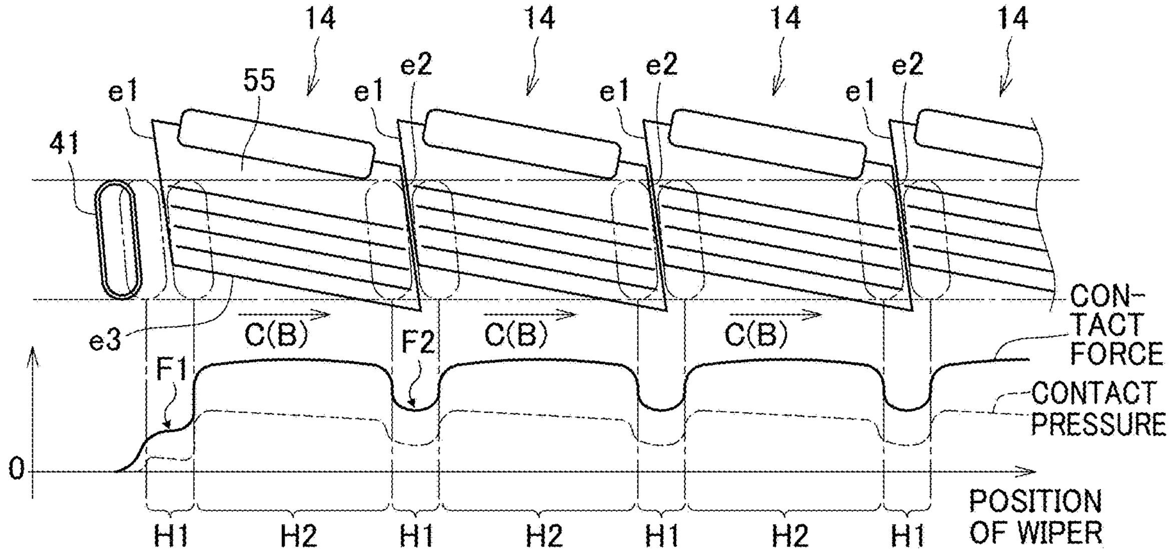
FIG. 11 is a schematic view of the liquid discharge heads and the suction wiper, and a graph illustrating the contact force and the contact pressure of the suction wiper according to a fifth embodiment of the present disclosure.

FIG. 11 is a schematic view of the liquid discharge heads 14 and the suction wiper 41, and a graph illustrating the contact force and the contact pressure of the suction wiper 41 according to a fifth embodiment of the present disclosure. Hereinafter, the contact force of the suction wiper 41 contacting the first end e1 of the first liquid discharge head 14 from a state in which the suction wiper 41 does not contact the liquid discharge head 14 is referred to as a "first contact force (F1 in FIG. 11)," and the contact force of the suction wiper 41 moving from the second end e2 of one liquid discharge head 14 (e.g., first liquid discharge unit) to the first end e1 of another liquid discharge head 14 (e.g., second liquid discharge unit) is referred to as a "second contact force (F2 in FIG. 11)." In the above-described embodiment illustrated in FIG. 7, the first contact force is set to be the same as the second contact force. On the other hand, in the fifth embodiment illustrated in FIG. 11, the first contact force is set to be smaller than the second contact force. That is, in the present embodiment, the contact force of the suction wiper 41 with the liquid discharge head 14 is set such that the first contact force is smaller than the second contact force and the second contact force is smaller than the contact force of the suction wiper 41 contacting the portion other than the first end e1 and the second end e2 (i.e., the first contact force<the second contact force<the contact force with the portion other than the first end e1 and the second end e2). As a result, damage and deterioration of the suction wiper 41 can be more effectively suppressed, and the cleaning capability can be improved.

Figure 12:
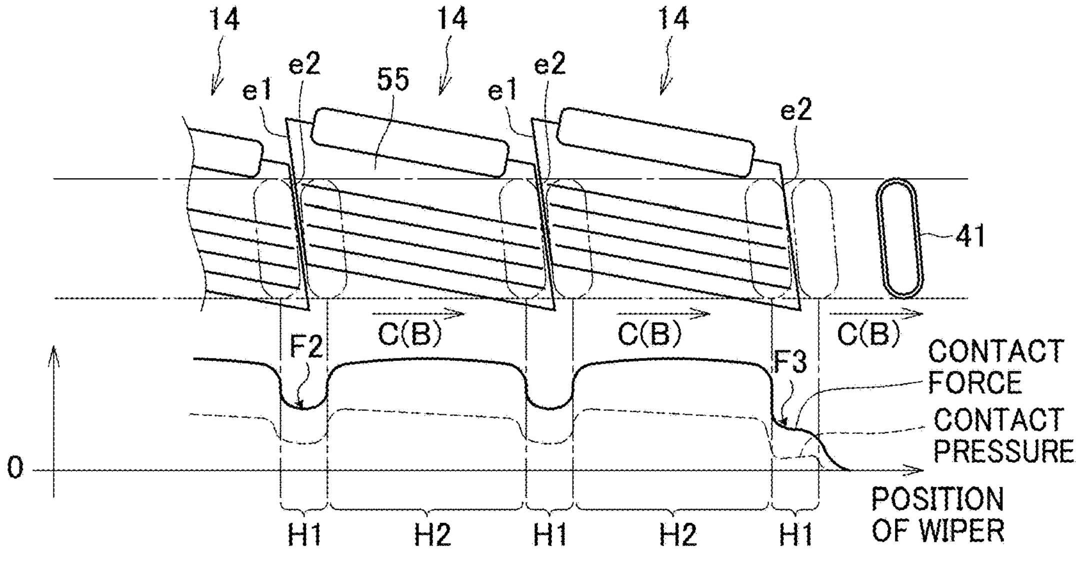
FIG. 12 is a schematic view of the liquid discharge heads and the suction wiper, and a graph illustrating the contact force and the contact pressure of the suction wiper according to a sixth embodiment of the present disclosure.

FIG. 2 is a schematic view of the liquid discharge heads 14 and the suction wiper 41, and a graph illustrating the contact force and the contact pressure of the suction wiper 41 according to a sixth embodiment of the present disclosure. Hereinafter, the contact force of the suction wiper 41 moving from a state in which the suction wiper 41 contacts the second end e2 of the last liquid discharge head 14 to a state in which the suction wiper 41 does not contact the liquid discharge head 14 is referred to as a "third contact force (F3 in FIG. 12)." In the sixth embodiment illustrated in FIG. 12, the third contact force is smaller than the second contact force. That is, in the present embodiment, the contact force of the suction wiper 41 with the liquid discharge head 14 is set such that the third contact force is smaller than the second contact force and the second contact force is smaller than the contact force of the suction wiper 41 contacting the portion other than the first end e1 and the second end e2 (i.e., the third contact force<the second contact force<the contact force with the portion other than the first end e1 and the second end e2). As a result, damage and deterioration of the suction wiper 41 can be more effectively suppressed, and the cleaning capability can be improved.

Figure 13:
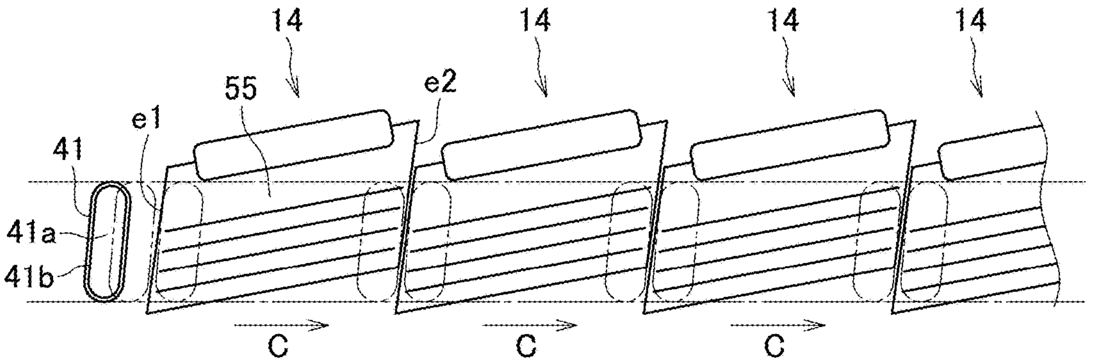
FIG. 13 is a schematic view of the liquid discharge heads and the suction wiper, illustrating an example in which a contact area of the suction wiper with the liquid discharge heads progressively decreases.

In each of the above-described embodiments illustrated in FIGS. 7 to 12, the contact area of the suction wiper 41 with the liquid discharge head 14 progressively increases as the suction wiper 41 moves from the first end e1 to the second end e2 of the liquid discharge head 14. In addition, the present disclosure is applicable to a configuration in which the contact area of the suction wiper 41 with the liquid discharge head 14 progressively decreases. Therefore, as illustrated in FIG. 13, the liquid discharge head 14 illustrated in FIG. 7 may be arranged so as to be laterally reversed. In this case, as the suction wiper 41 moves from the first end e1 to the second end e2 of the liquid discharge head 14 in the movement direction C in FIG. 13, the contact area of the suction wiper 41 with the liquid discharge head 14 progressively decreases. Also in the liquid discharge head 14 having such a configuration, similarly to each of the above-described embodiments, the contact force or the contact pressure of the suction wiper 41 contacting one of the first end e1 and the second end e2 of the liquid discharge head 14 is smaller than the contact force or the contact pressure of the suction wiper 41 contacting the portion other than the first end e1 and the second end e2, thereby suppressing damage and deterioration of the suction wiper 41.

Figure 14:
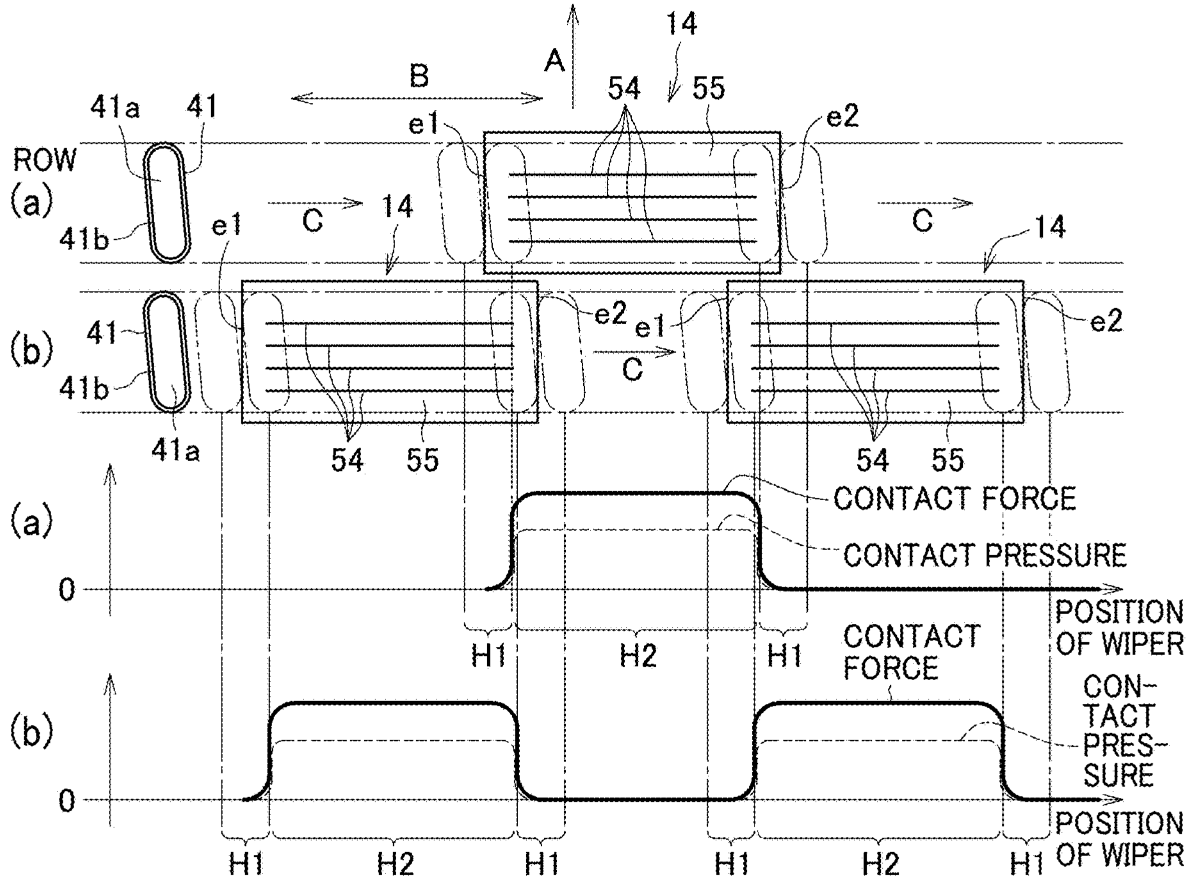
FIG. 14 is a schematic view of the liquid discharge heads and the suction wipers, and a graph illustrating the contact force and the contact pressure of the suction wipers according to a seventh embodiment of the present disclosure.

Next, FIG. 14 is a schematic view of the liquid discharge heads 14 and the suction wipers 41, and a graph illustrating the contact force and the contact pressure of the suction wipers 41 according to a seventh embodiment oldie present disclosure. As illustrated in FIG. 14, in the present embodiment, the nozzle surface 55 of each liquid discharge head 14 has a rectangular shape. In the present embodiment, the multiple liquid discharge heads 14 are disposed in multiple rows shifted from each other in the sheet conveyance direction A (the direction intersecting the movement direction C of the suction wiper 41), and the multiple liquid discharge heads 14 are shifted from each other in the sheet width directions B (the movement direction C of the suction wiper 41).

Further, in the present embodiment, the multiple suction wipers 41 are disposed (shifted) corresponding to the multiple rows of the liquid discharge heads 14 in the sheet conveyance direction A, respectively. That is, one of the multiple suction wipers 41 is disposed corresponding to the liquid discharge head 14 in an upper row (a) illustrated in FIG. 14 and, another of the multiple suction wipers 41 is disposed corresponding to the liquid discharge head 14 in a lower row (b) illustrated in FIG. 14. Note that the suction wipers 41 and the liquid discharge heads 14 may be arranged in three or more rows.

With such a configuration in the present embodiment, similarly to the above-described embodiments, each suction wiper 41 moves in the movement direction C to clean the nozzle surface 55 of the liquid discharge head 14 in each row. Also in the present embodiment, when the contact portion 41*b* of each suction wiper 41 contacts the first end e1 or the second end e2 of each liquid discharge head 14, the contact with the first end e1 or the second end e2 may cause damage or deterioration of the contact portion 41*b* of each suction wiper 41. That is, damage and deterioration of the suction wiper 41 may occur not only in a case in which the first and second ends e1 and e2 of the liquid discharge head 14 are substantially perpendicular to the movement direction C of the suction wiper 41 as in the above-described embodiments, but also in a case in which the first and second ends e1 and e2 are perpendicular to the movement direction C of the suction wiper 41.

For this reason, also in the present embodiment, when the contact portion 41*b* of each suction wiper 41 passes through the first end e1 and the second end e2 of each liquid discharge head 14, the contact three of each suction wiper 41 in the movement ranges H1 is relatively small. Accordingly, similarly to the above-described embodiments, the contact portion 41*b* of the suction wiper 41 can be prevented from being damaged and deteriorated when the contact portion 41*b* of the suction wiper 41 passes through one of the first end e1 and the second end e2, thereby maintaining the cleaning function of the suction wiper 41 for a long time. In the present embodiment, when the suction wiper 41 moves from the first end e1 to the second end e2 of the liquid discharge head 14, the contact area of the suction viper 41 with the liquid discharge head 14 is the same (constant). For this reason, when the contact force of the suction wiper 41 with the liquid discharge head 14 is constant, the contact pressure of the suction wiper 41 can also be kept constant, and thus the change of the suction force of the suction wiper 41 or the wiping action can be prevented. In addition, the cleaning function can be stabilized. Note that the contact pressure of the suction wiper 41 with the liquid discharge head 14 is not limited to being kept constant and may change.

Any one of the control methods illustrated in FIGS. 7 to 10 may be adopted for specific control of the contact pressure of each suction wiper 41 in the present embodiment. In the present embodiment, the contact forces of the respective suction wipers 41 are controlled at different timings because the respective suction wipers 41 reach the corresponding liquid discharge heads 14 at the different timings. That is, in the present embodiment, as illustrated in timing charts of the contact forces of the rows (a) and (b) illustrated in FIGS. 14, first, the contact force of the suction wiper 41 in the row (b) decreases at the timing when the contact portion 41*b* of the suction wiper 41 in the row (b) reaches the second end e2 of the corresponding liquid discharge head 14, and then the contact force of the suction wiper 41 in the row (a) decreases at the timing when the contact portion 41*b* of the suction wiper 41 in the row (a) reaches the second end e2 of the corresponding liquid discharge head 14. As described above, in the present embodiment, the contact forces of the suction wipers 41 change independently at different timings, so that damage and deterioration of the contact portion 41*b* of each suction wiper 41 can be suppressed.

Figure 15:
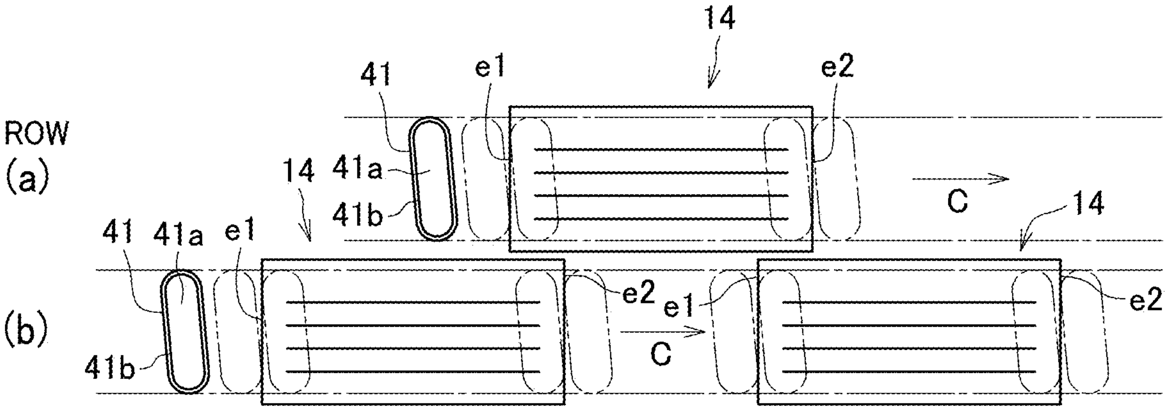
FIG. 15 is a schematic view of the liquid discharge heads and the suction wipers according to an eighth embodiment of the present disclosure.

In an eighth embodiment of the present disclosure illustrated in FIG. 15, the relative positions (movement start positions) of the respective suction wipers 41 relative to the corresponding liquid discharge heads 14 are set to be the same. Therefore, the timings when the contact portions 41*b* of the respective suction wipers 41 reach the corresponding liquid discharge heads 14 are the same. In this case, the contact forces of the respective suction wipers 41 that contact the corresponding liquid discharge heads 14 can change in synchronization with each other in the rows (a) and (b).

Figure 16:
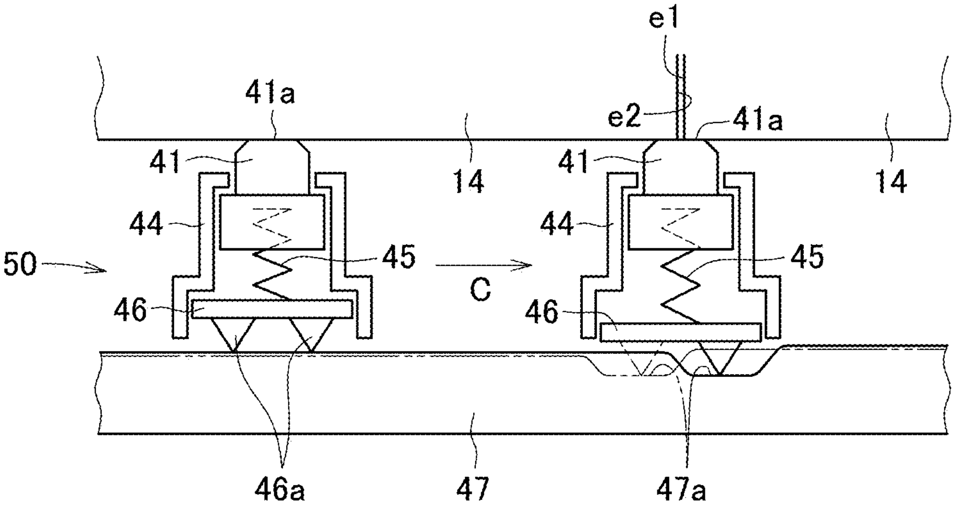
FIG. 16 is a schematic view illustrating an example of a contact-force changer according to embodiments of the present disclosure.
Figure 17A:
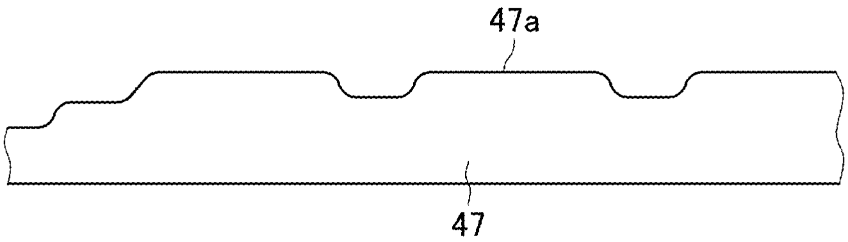
FIGS. 17A to 17D are schematic views illustrating of examples of a guide portion according to embodiments of the present disclosure.
Figure 17B:
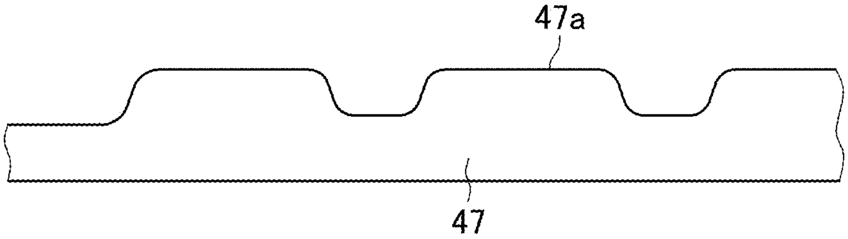
Figure 17C:
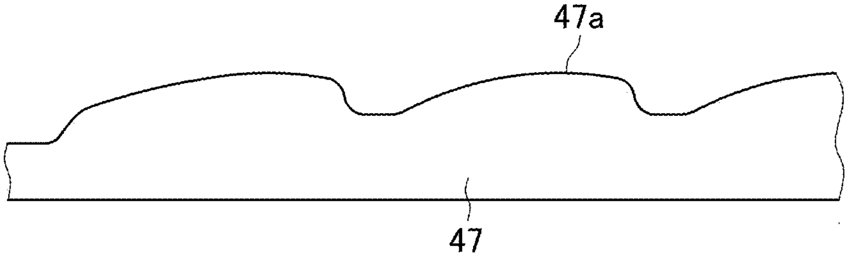
Figure 17D:
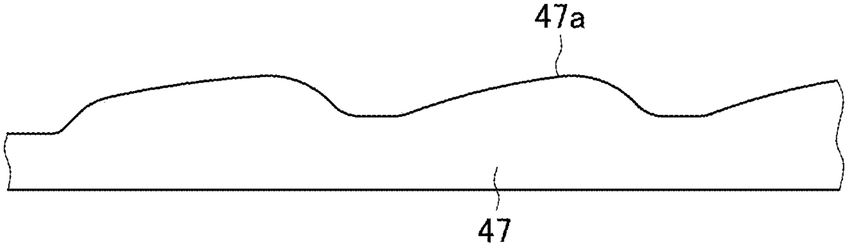

Next, a contact-force changer that changes the contact force of the suction wiper 41 with the liquid discharge head 14 is described. FIG. 16 is a schematic view of a contact-force changer 50 according to the present embodiment. The contact-force changer 50 illustrated in FIG. 16 includes a holder 44 that holds the suction wiper 41, a spring 45 as an elastic member that presses the suction wiper 41, a support 46 that supports the spring 45, and a guide 47 that guides the support 46 along the movement direction C of the suction wiper 41. The holder 44 movably holds the suction wiper 41 toward and away from the liquid discharge head 14. In addition, the holder 44 holds the suction wiper 41 such that at least the suction port 41*a* at the tip of the suction wiper 41 projects out of the holder 44 toward the liquid discharge head 14. The spring 45 is disposed between the suction wiper 41 and the support 46, and an end of the spring 45 opposite to the suction wiper 41 is supported by the support 46. Since the spring 45 is compressed between the suction wiper 41 and the support 46, the suction wiper 41 is pressed toward the liquid discharge head 14. The support 46 has a plurality of projections 46*a* that contacts the guide 47. In the present embodiment, to stabilize the posture of the suction wiper 41, the support 46 contacts the guide 47 via the plurality of projections 46*a*. That is, the support 46 contacts the guide 47 at multiple positions that are not on the same straight line, thereby stabilizing the posture of the suction wiper 41.

In the contact-force changer 50 having such a configuration, when the suction wiper 41 moves to perform the cleaning operation, the support 46 is guided along the guide portion 47*a* of the guide 47. As a result, the end of the spring 45 opposite to the suction wiper 41 (the end adjacent to the support 46) moves toward and away from the liquid discharge head 14, thereby changing a compression amount of the spring 45. That is, when the support 46 is guided by the guide portion 47*a* and moves toward the liquid discharge head 14 as illustrated on the left side in FIG. 16, the compression amount of the spring 45 increases. On the other hand, when the support 46 is guided by the guide portion 47*a* and moves away from the liquid discharge head 14 as illustrated on the right side in FIG. 16, the compression amount of the spring 45 decreases. As a result, the contact force of the suction wiper 41 with the liquid discharge head 14 changes. As illustrated in FIGS. 17A to 17D, the guide portion 47*a* is formed in a shape following any one of changes of the contact forces illustrated in FIGS. 7 to 10 described above, for example. Accordingly, the contact force of the suction wiper 41 can be reduced at the first end e1 and the second end e2. As a result, damage and deterioration of the suction wiper 41 can be suppressed.

Figure 18:
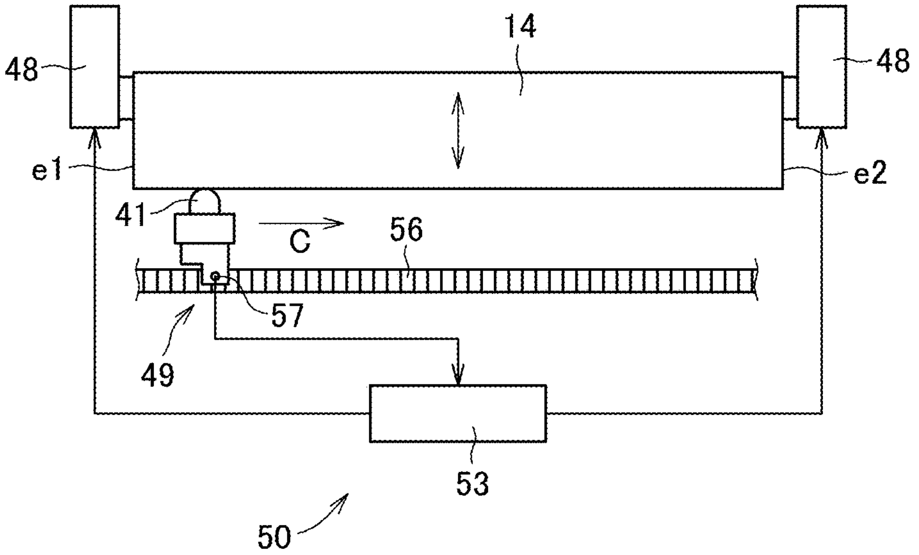
FIG. 18 is a schematic view illustrating another example of the contact-force changer according to embodiments of the present disclosure.

FIG. 18 is a schematic view of the contact-force changer 50 according to another embodiment of the present disclosure. The contact-force changer 50 illustrated in FIG. 18 does not move the suction wiper 41 toward and away from the liquid discharge head 14. By contrast, the contact-force changer 50 moves the liquid discharge head 14 toward and away from the suction wiper 41 to change the contact force of the suction wiper 41 with the liquid discharge head 14. Specifically, the contact-force changer 50 according to the present embodiment includes a contact-separation driver 48 that moves the liquid discharge head 14 toward and away from the suction wiper 41, a position detector 49 that detects a relative movement position of the suction wiper 41 relative to the liquid discharge head 14, and a controller 53 that controls the contact-separation driver 48 based on a detection signal of the position detector 49.

The position detector 49 includes an encoder 56 in which black and white band patterns are arranged alternately, and an optical sensor 57 including a light emitting unit and a light receiving unit. The optical sensor 57 is movable together with the suction wiper 41. When the suction wiper 41 moves, the light emitting unit of the optical sensor 57 irradiates the encoder 56 with light, and the light receiving unit of the optical sensor 57 receives the light reflected by the encoder 56. At that time, the controller 53 counts pulse signals to detect the relative movement position of the suction wiper 41. Further, the controller 53 drives the contact-separation driver 48 based on the detected relative movement position of the suction wiper 41. As a result, the contact force of the suction wiper 41 can be reduced at the timing when the suction wiper 41 passes through the first end e1 and the second end e2 of the liquid discharge head 14.

Figure 19:
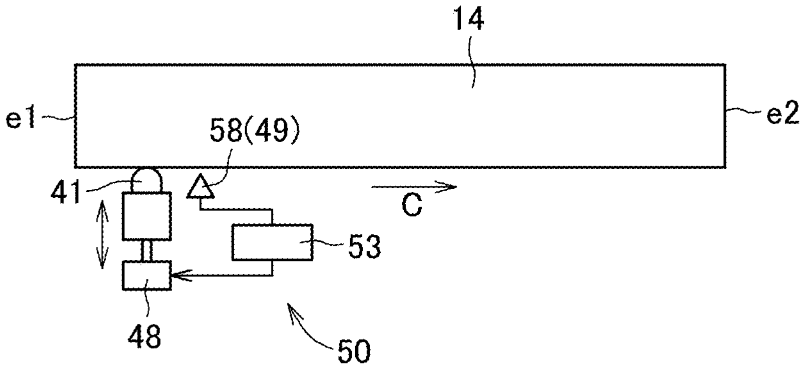
FIG. 19 is a schematic view illustrating yet another example of the contact-force changer according to embodiments of the present disclosure.

FIG. 19 is a schematic view of the contact-force changer 50 according to yet another embodiment of the present disclosure. In the embodiment illustrated in FIG. 19, the controller 53 controls the contact-separation driver 48 that moves the suction wiper 41 toward and away from the liquid discharge head 14 based on a detection signal of a sensor 58 (position detector 49). The sensor 58 may be an optical sensor or a magnetic sensor. Instead of the sensor 58, a timer may be used to measure the movement time of the suction wiper 41, and the relative movement position of the suction wiper 41 may be acquired based on the measured movement time of the suction wiper 41. In still another embodiment, the contact-force changer 50 may moves both the suction wiper 41 and the liquid discharge head 14 toward and away from each other.

Various embodiments of the present disclosure have been described above. The above-described embodiments are illustrative and do not limit the present disclosure. It is therefore to be understood that within the scope of the appended claims, numerous additional modifications and variations are possible to the present disclosure otherwise than as specifically described herein.

Figure 20:
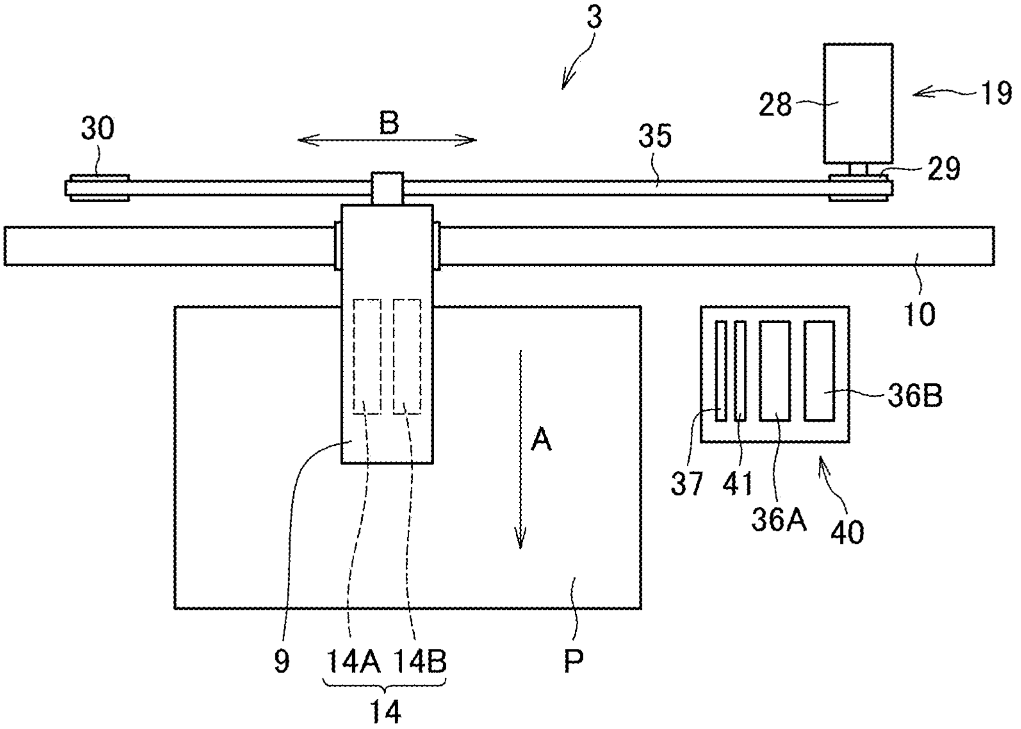
FIG. 20 is a schematic view of a serial-type liquid discharge device according to embodiments of the present disclosure.

For example, the present disclosure is also applicable to a serial-type liquid discharge device as illustrated in FIG. 20. The serial-type liquid discharge device (image forming device 3) illustrated in FIG. 20 includes a carriage 9 on which the liquid discharge head 14 is mounted, a guide (guide rod) 10 that guides the carriage 9 in the main scanning direction which is the sheet width directions B, and a driver 19 that moves the carriage 9.

In the present embodiment, the carriage 9 includes a liquid discharge head 14A for black having a discharge port array for discharging black ink droplets and a liquid discharge head 14B for color having a discharge port array for discharging ink of each color of cyan, magenta, and yellow. In the liquid discharge heads 14A and 14B, the respective discharge port arrays are arranged in a direction intersecting the main scanning direction (i.e., sheet conveyance direction A), and each ink is discharged downward. Note that individual liquid discharge heads may be provided for different colors (e.g., cyan, magenta, and yellow). Alternatively, one liquid discharge head may discharge inks of black and cyan and the other liquid discharge head may discharge inks of magenta and yellow. Further, the color of ink to be used is not limited to the above colors.

Each of the liquid discharge heads 14A and 14B includes an energy generator for discharging ink, for example, a piezoelectric actuator such as a piezoelectric element, a thermal actuator utilizing film boiling of liquid using a thermoelectric conversion element such as a thermal resistor, a shape-memory alloy actuator utilizing metallic phase change due to temperature change, an electrostatic actuator utilizing electrostatic force, and the like.

In addition, a plurality of sub-tanks for supplying inks of the respective colors to the liquid discharge heads 14A and 14B is mounted on the carriage 9. The inks are supplied to the sub-tanks from ink cartridges 15Y, 15M, 15C, and 15Bk (see FIG. 1) mounted on the body of the image forming apparatus 100 via ink supply tubes.

The driver 19 includes a motor 28 serving as a driving source and a timing belt 35 looped around a drive pulley 29 and a driven pulley 30. As the motor 28 is driven and the drive pulley 29 is rotated, the timing belt 35 circumferentially moves. Accordingly, the carriage 9 coupled to the timing belt 35 is moved in the main scanning direction (the sheet width directions B) along the guide 10. As the rotation direction of the motor 28 is switched between one direction and the opposite direction, the carriage 9 reciprocates in the main scanning direction.

As the sheet P is conveyed to the image forming device 3, each of the liquid discharge heads 14A and 14B discharges ink based on image signals while the carriage 9 moves in the main scanning direction, thereby forming an image for one line on the sheet P not in motion. Then, the sheet P is conveyed by a predetermined amount in the sheet conveyance direction A in FIG. 20, and an image for the next line is formed. Subsequently, the conveyance and stop of the sheet P and the reciprocating movement of the carriage 9 are repeated, and ink is discharged onto the sheet P, thereby forming an entire image.

The serial-type liquid discharge device (image forming device 3) according to the present embodiment includes the maintenance device 40 that maintains each of the liquid discharge heads 14A and 14B. The maintenance device 40 includes caps 36A and 36B that cover the liquid discharge heads 14A and 14B, respectively, a blade wiper 37 that is a blade-shaped cleaner, and the suction wiper 41 that has the same function described in the above embodiments.

When the maintenance operation is performed, the liquid discharge heads 14A and 14B move in the main scanning direction (the sheet width directions B) so that the liquid discharge heads 14A and 148 approach the maintenance device 40. As the liquid discharge heads 14A and 14B further move in the main scanning direction, the blade wiper 37 and the suction wiper 41 move relative to the liquid discharge heads 14A and 14B while contacting the liquid discharge heads 14A and 14B. As a result, ink adhering to the nozzles of the liquid discharge heads 14A and 14B is removed.

Even in such a serial-type liquid discharge device, when the suction wiper 41 contacts the intersecting ends, which intersect the sheet width direction B, of the liquid discharge heads 14A and 14B during the cleaning operation, the suction wiper 41 may be damaged or deteriorated. Therefore, the present disclosure is preferably applied to a serial-type liquid discharge device. As the present disclosure is applied to the serial-type liquid discharge device, damage and deterioration of the suction wiper 41 due to contact of the suction wiper 41 with the intersecting ends can be suppressed, and the cleaning function can be maintained for a long time.

The damage and deterioration of the cleaner is not limited to the suction wiper 41. That is, also in the blade wiper 37 illustrated in FIG. 20, as the blade wiper 37 moves relative to the liquid discharge heads 14A and 14B and contacts the intersecting ends of the liquid discharge heads 14A and 14B, the blade wiper 37 may be damaged or deteriorated. Therefore, even in such a blade wiper 37, the contact force and the contact pressure of the blade wiper 37 contacting the intersecting, ends are reduced, thereby suppressing damage and deterioration of the blade wiper 37.

Figure 21:
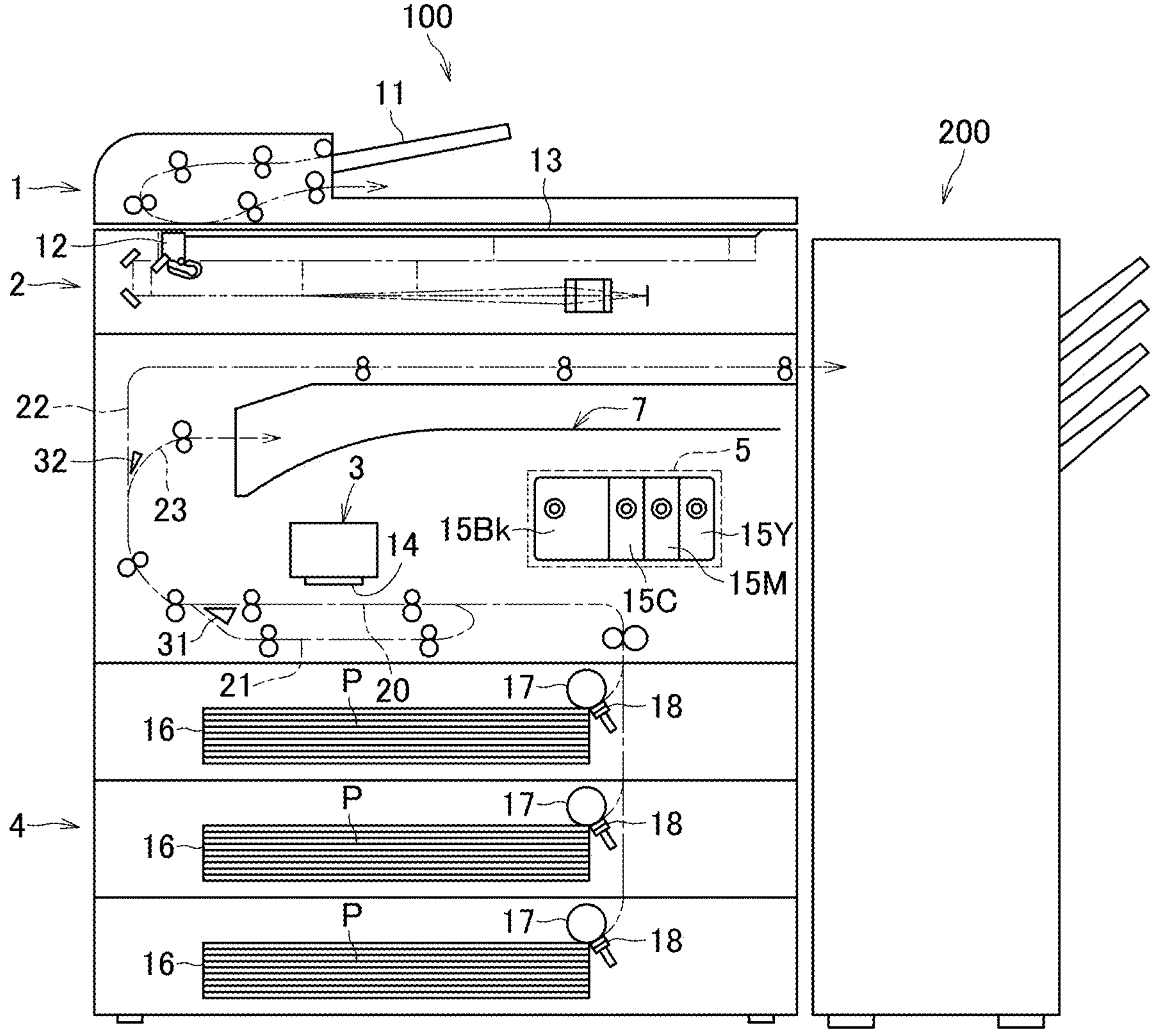
FIG. 21 is a schematic view illustrating another example of the image forming apparatus to which embodiments of the present disclosure can be applied.
Figure 22:
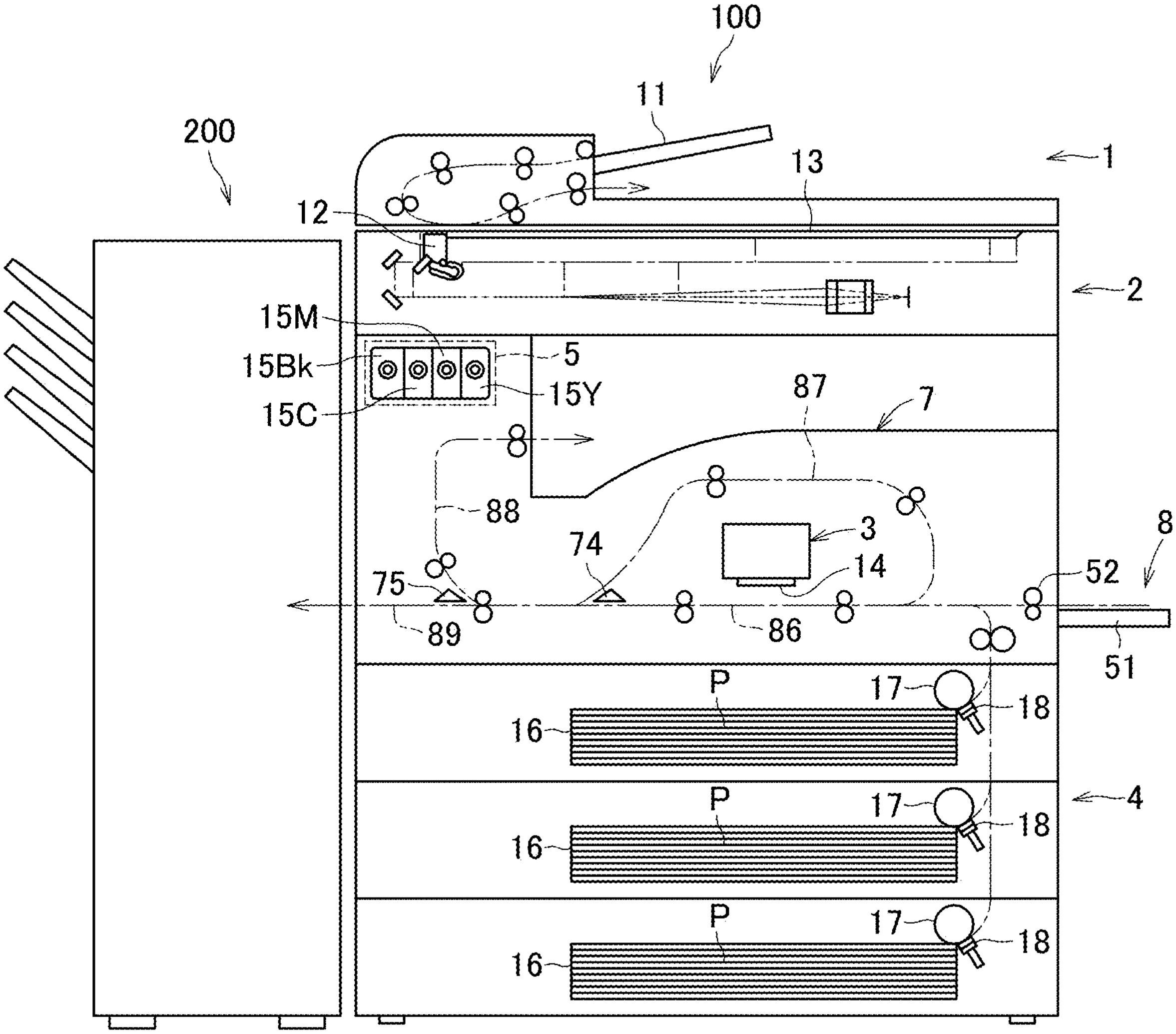
FIG. 22 is a schematic view illustrating yet another example of the image forming apparatus to which embodiments of the present disclosure can be applied.

Further, the above-described embodiments of the present disclosure can be applied not only to the image forming apparatus 100 illustrated in FIG. 1 but also, for example, to image forming apparatuses 100 illustrated in FIGS. 21 and 22. Hereinafter, descriptions are given of other examples of the configuration of the image forming apparatus 100 to which the present disclosure is applicable. Note that the configuration of the image forming apparatus 100 is mainly described regarding differences from the above-described embodiments, and the other configurations are basically similar to the configurations of the above-described embodiments. Therefore, descriptions of such similar configurations are omitted below.

Similarly to the above-described embodiments, the image forming apparatus 100 illustrated in FIG. 21 includes the document conveyance device 1, the image reading device 2, the image forming device 3, the sheet feeding device 4, the cartridge mount 5, and the sheet ejection portion 7. However, the image forming apparatus 100 illustrated in FIG. 21 does not include the bypass sheet feeding device 8. Unlike the image forming device 3 in FIG. 1, the image forming device 3 in FIG. 20 is disposed facing a sheet conveyance passage 20 in which the sheet P is conveyed in the horizontal direction.

In the image forming apparatus 100 illustrated in FIG. 21, as a printing operation starts, the sheet P is supplied from the sheet feeding device 4 and conveyed to the image forming device 3. As the sheet P is conveyed to the image forming device 3, ink is discharged from the liquid discharge head 14 onto the sheet P to form an image on the sheet P.

In the duplex printing, after the sheet P has passed the image forming device 3, the sheet P is conveyed in the opposite direction opposite to the sheet conveyance direction, and a first passage changer 31 guides the sheet P to a sheet reverse passage 21. Then, as the sheet P passes the sheet reverse passage 21, the sheet P is reversed front the front face to the back face and conveyed to the image forming device 3 again, and an image is formed on the back face of the sheet P.

A second passage changer 32 guides the sheet P, on one face or both faces of which the images have been formed, selectively to a sheet conveyance passage 23 toward the sheet ejection portion 7 or to a sheet conveyance passage 22 toward the sheet alignment apparatus 200. When the sheet P is guided to the sheet conveyance passage 23 toward the sheet ejection portion 7, the sheet P is ejected onto the sheet ejection portion 7. On the other hand, when the sheet P is guided to the sheet conveyance passage 22 toward the sheet alignment apparatus 200, the sheet is conveyed to the sheet alignment apparatus 200, and the bundle of sheets P is aligned and stacked.

Similarly to the image forming apparatus 100 illustrated in FIG. 1, the image forming apparatus 100 illustrated in FIG. 22 includes the document conveyance device 1, the image reading device 2, the image forming device 3, the sheet feeding device 4, the cartridge mount 5, the sheet ejection portion 7, and the bypass sheet feeding device 8. Note that, in this case, similarly to the image forming device 3 in FIG. 21, the image forming device 3 in FIG. 22 is disposed facing a sheet conveyance passage 86 in which the sheet P is conveyed in the horizontal direction.

In the image forming apparatus 100 illustrated in FIG. 22, as a printing operation starts, the sheet P is supplied from the sheet feeding device 4 or the bypass sheet feeding device 8, and is conveyed to the image forming device 3. As the sheet P is conveyed to the image forming device 3, ink is discharged from the liquid discharge head 14 onto the sheet P to form an image on the sheet P.

In the duplex printing, after the sheet P has passed the image forming device 3, the sheet P is conveyed in the opposite direction opposite to the sheet conveyance direction, and a first passage changer 74 guides the sheet P to a sheet reverse passage 87. Then, as the sheet P passes the sheet reverse passage 87, the sheet P is reversed from the front face to the back face and conveyed to the image forming device 3 again, so that an image is formed on the back face of the sheet P.

A second passage changer 75 guides the sheet P, on one face or both faces of which the images have been formed, selectively to a sheet conveyance passage 88 toward the sheet ejection portion 7 or to a sheet conveyance passage 89 toward the sheet alignment apparatus 200. When the sheet P is guided to the sheet conveyance passage 88 toward the sheet ejection portion 7, the sheet P is ejected onto the sheet ejection portion 7. On the other hand, when the sheet P is guided to the sheet conveyance passage 89 toward the sheet alignment apparatus 200, the sheet P is conveyed to the sheet alignment apparatus 200, and the bundle of sheets P is aligned and stacked.

The image forming apparatus 100 illustrated in FIG. 21 or 22, to which the present disclosure is applied, can attain the same effects as described above. That is, damage and deterioration of the cleaner that cleans the liquid discharge head 14 are suppressed, and the cleaning function can be maintained for a long time.

The present disclosure is not limited to being applied to an inkjet image forming apparatus that discharges ink onto a sheet to form an image on the sheet. The term "liquid discharge device" according to embodiments of the present disclosure includes, in addition to apparatuses to discharge liquid to a material onto which liquid can adhere, apparatuses to discharge liquid into gas (air) or liquid. The "liquid discharge device" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The liquid discharge device according to embodiments of the present disclosure may include devices to feed, convey, and eject the material onto which liquid can adhere. The liquid discharge device may further include a pretreatment apparatus to coat a treatment liquid onto the material, and a post-treatment apparatus to coat a treatment liquid onto the material, onto which the liquid has been discharged. The term "material onto which liquid can adhere" represents a material onto which liquid is at least temporarily adhered, a material onto which liquid is adhered and fixed, or a material into which liquid is adhered to permeate. Specific examples of the "material onto which liquid can adhere" include, but are not limited to, a recording media such as a paper sheet, a resin film, or cloth, an electronic component such as an electronic substrate or a piezoelectric element, and a medium such as layered powder, an organ model, or a testing cell. The "material onto which liquid can adhere" includes any materials onto which liquid is adhered, unless particularly limited. Examples of the "material onto which liquid can adhere" include any materials onto which liquid can adhere even temporarily, such as paper, thread, fiber, fabric, leather, metal, plastic, glass, wood, ceramic, construction materials (e.g., wall paper or floor material), and cloth textile. Examples of the liquid include ink, treatment liquid, DNA sample, resist, pattern material, binder, fabrication liquid, and solution or liquid dispersion containing amino acid, protein, or calcium.

Examples of the "liquid discharge device" further include a treatment liquid, coating apparatus to discharge a treatment liquid to a sheet to coat, with the treatment liquid, a sheet surface to reform the sheet surface and an injection granulation apparatus in which a composition liquid including raw materials dispersed in a solution is discharged through nozzles to granulate fine particles of the raw materials.

As described above, according to the present disclosure, the cleaner is effectively prevented from being damaged and deteriorated.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

What is claimed is:

1. A liquid discharge device, comprising:

a liquid discharger to discharge a liquid, the liquid discharger having a first end, a second end, and a third end extending in a direction intersecting the first end and the second end; and a cleaner to move relative to the liquid discharger in a movement direction from the first end toward the second end while contacting the liquid discharger, a contact force of the cleaner contacting one of the first end and the second end being smaller than a contact force of the cleaner contacting a portion of the liquid discharger other than the first end and the second end, wherein the contact force of the cleaner with the liquid discharger progressively decreases before the cleaner contacts the second end.

2. The liquid discharge device according to claim 1, wherein a contact pressure of the cleaner contacting one of the first end and the second end is smaller than a contact pressure of the cleaner contacting the portion of the liquid discharger other than the first end and the second end.

3. The liquid discharge device according to claim 1, wherein a contact pressure of the cleaner contacting the portion of the liquid discharger other than the first end and the second end is constant.

4. The liquid discharge device according to claim 3, wherein a contact force of the cleaner contacting the third end increases with increasing a contact area of the cleaner with the liquid discharger to keep the contact pressure of the cleaner with the liquid discharger constant.

5. The liquid discharge device according to claim 1, wherein the liquid discharger includes multiple liquid dischargers disposed in multiple rows shifted from each other in a direction intersecting the movement direction, wherein the cleaner includes multiple cleaners disposed corresponding to the multiple rows, respectively, and wherein the contact force of the cleaner with the liquid discharger changes independently for each of the multiple liquid dischargers or each of the multiple cleaners.

6. The liquid discharge device according to claim 1, wherein the liquid discharger includes multiple liquid dischargers disposed in multiple rows shifted from each other in a direction intersecting the movement direction, wherein the cleaner includes multiple cleaners disposed corresponding to the multiple rows, respectively, and wherein the contact force of the cleaner with the liquid discharger changes in synchronization with each other for the multiple liquid dischargers and the multiple cleaners.

7. The liquid discharge device according to claim 1, further comprising a contact-force changer to move the cleaner toward and away from the liquid discharger to change the contact force of the cleaner with the liquid discharger.

8. The liquid discharge device according to claim 1, further comprising a contact-force changer to move the liquid discharger toward and away from the cleaner to change the contact force of the cleaner with the liquid discharger.

9. The liquid discharge device according to claim 1, further comprising a contact-force changer to change the contact force of the cleaner with the liquid discharger, the contact-force changer including:

an elastic structure to press the cleaner toward the liquid discharger; and a guide to guide an end of the elastic structure opposite to the cleaner toward and away from the liquid discharger along with a relative movement of the cleaner from the first end to the second end.

10. The liquid discharge device according to claim 1, wherein the liquid discharger includes a first liquid discharger and a second liquid discharger adjacent to and downstream from the first liquid discharger in the movement direction, wherein the contact force of the cleaner contacting the second end of the first liquid discharger and the first end of the second liquid discharger is smaller than the contact force of the cleaner contacting a portion of the liquid discharger other than the first end and the second end of the first liquid discharger and the second liquid discharger, and wherein the contact force of the cleaner coming into contact with the first end of the first liquid discharger from a state in which the cleaner does not contact the liquid discharger is smaller than the contact force of the cleaner contacting the second end of the first liquid discharger and the first end of the second liquid discharger.

11. An image forming apparatus comprising the liquid discharge device according to claim 1.

12. A liquid discharge device, comprising:

a liquid discharger to discharge a liquid, the liquid discharger having a first end, a second end, and a third end extending in a direction intersecting the first end and the second end;

a cleaner to move relative to the liquid discharger in a movement direction from the first end toward the second end while contacting the liquid discharger, a contact force of the cleaner contacting one of the first end and the second end being smaller than a contact force of the cleaner contacting a portion of the liquid discharger other than the first end and the second end;

a contact-force changer to change the contact force of the cleaner with the liquid discharger;

a position detector to detect a relative movement position of the cleaner relative to the liquid discharger from the first end toward the second end; and a contact-separation driver configured to relatively move the cleaner toward or away from the liquid discharger based on the relative movement position of the cleaner detected by the position detector.

13. A liquid discharge device, comprising:

means for discharging liquid to discharge a liquid, the means for discharging liquid having a first end, a second end, and a third end extending in a direction intersecting the first end and the second end; and means for cleaning to move relative to the means for discharging liquid in a movement direction from the first end toward the second end while contacting the means for discharging liquid, a contact force of the means for cleaning contacting one of the first end and the second end being smaller than a contact force of the means for cleaning contacting a portion of the means for discharging liquid other than the first end and the second end, wherein the contact force of the means for cleaning with the means for discharging liquid progressively decreases before the means for cleaning contacts the second end.

14. The liquid discharge device according to claim 13, wherein a contact pressure of the means for cleaning contacting one of the first end and the second end is smaller than a contact pressure of the means for cleaning contacting the portion of the means for discharging liquid other than the first end and the second end.

15. The liquid discharge device according to claim 13, wherein a contact pressure of the means for cleaning contacting the portion of the means for discharging liquid other than the first end and the second end is constant.

16. The liquid discharge device according to claim 15, wherein a contact force of the means for cleaning contacting the third end increases with increasing a contact area of the means for cleaning with the means for discharging liquid to keep the contact pressure of the means for cleaning with the means for discharging liquid constant.

17. The liquid discharge device according to claim 13, wherein the means for discharging liquid includes multiple means for discharging liquids disposed in multiple rows shifted from each other in a direction intersecting the movement direction, wherein the means for cleaning includes multiple means for cleaning disposed corresponding to the multiple rows, respectively, and wherein the contact force of the means for cleaning with the means for discharging liquid changes independently for each of the multiple means for discharging liquids or each of the multiple means for cleaning.

18. The liquid discharge device according to claim 13, wherein the means for discharging liquid includes multiple means for discharging liquids disposed in multiple rows shifted from each other in a direction intersecting the movement direction, wherein the means for cleaning includes multiple means for cleaning disposed corresponding to the multiple rows, respectively, and wherein the contact force of the means for cleaning with the means for discharging liquid changes in synchronization with each other for the multiple means for discharging liquids and the multiple means for cleaning.

19. The liquid discharge device according to claim 13, further comprising means for changing a contact force to move the means for cleaning toward and away from the means for discharging liquid to change the contact force of the means for cleaning with the means for discharging liquid.

20. The liquid discharge device according to claim 13, further comprising:

means for changing a contact-force to move the means for discharging liquid toward and away from the means for cleaning to change the contact force of the means for cleaning with the means for discharging liquid.

* * * * *